May 23, 1967 P. BREKKE 3,320,840
TOOL HOLDER BLOCK
Filed April 1, 1966

INVENTOR.
PETER BREKKE

United States Patent Office 3,320,840
Patented May 23, 1967

3,320,840
TOOL HOLDER BLOCK
Peter Brekke, Mill City, Oreg.
(10311 Lev Ave., Pacoima, Calif. 91331)
Substituted for abandoned application Ser. No. 108,665, May 8, 1961. This application Apr. 1, 1966, Ser. No. 539,527
12 Claims. (Cl. 82—37)

This invention relates to a tool holder block and is more particularly concerned with an improved cutting tool holder block adapted for use in connection with laths and other similar rotary work holding spindles, or the like, and with tool rests for supporting and shifting a cutting tool, into and out of engagement with a piece of work held and rotated by the spindles.

An object of my invention is to provide a novel holder construction adapted to be secured in fixed position on a tool rest and adapted to releasably engage and hold a cutting tool.

Another object of the present invention is to provide a tool holder of the character referred to involving two relatively shiftable tool engaging parts and a novel quick operating, manually operable cam actuated operating means for shifting said parts into and out of tight clamped engagement with a tool.

It is another object of the present invention to provide a structure of the character referred to wherein the relatively shiftable tool engaging parts are stout and rigid, are interengaged to provide a maximum of relative stability and rigidity and which are so formed and arranged as to embrace and clamp the tool related thereto in rigid fixed position.

It is an object of the present invention to provide a structure of the character referred to which comprises a small number of parts, each of which is easy and economical to manufacture, a structure which is both highly effective and dependable in operation, and a structure which is tough and durable.

A further object is to provide a tool holder block of the character referred to which is easy, quick and convenient to operate and which requires no special tools or skill to operate.

The various objects and features of my invention will be fully understood from the following detailed description of a typical preferred form and application of my invention, throughout which description reference is made to the accompanying drawings, in which.

Figure 1:
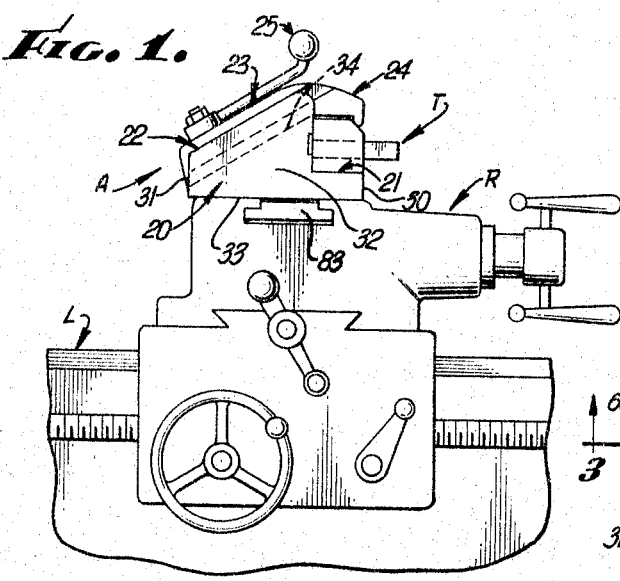
FIG. 1 is a side elevational view showing my new invention applied to a machine tool.
Figure 2:
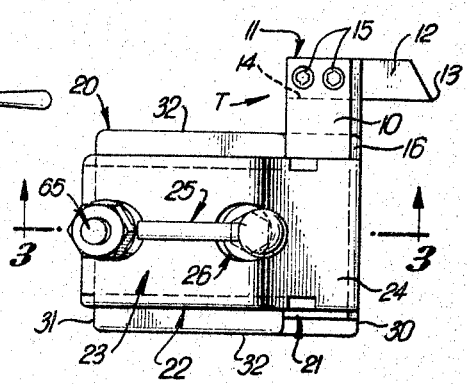
FIG. 2 is a plan view of my new invention.

The tool holder block A provided by the present invention and which is illustrated in the accompanying drawings is adapted to be engaged and supported on the compound tool rest R of a lath L, or the like, and is adapted to releasably engage and hold a suitable cutting tool T.

Since the details of construction of the lath L and the tool rest R related thereto can vary widely without affecting the novelty of the invention and since such constructions are to a great extent, standard and well known in the art, I will not burden this application with unnecessary illustration and description of a particular lath and rest construction with which the invention might be related.

The tool T which is engaged and held by my new tool holder block is a standard, conventional construction and includes an elongate tool bar 10, square in cross-section and provided at one end with means 11 for receiving and/or attacking a suitable cutter 12.

The cutter 12 is shown as a simple elongate piece of tool steel, square in cross-section and formed at one end to establish a cutting edge 13.

The means 11 for securing the cutter 12 to the bar is shown as including a slot 14 entering one end of the bar and in which the cutter is engaged to extend transversely of the bar and project laterally therefrom and a pair of screw fasteners 15 carried by the bar and engaging the cutter.

In accordance with normal construction, one longitudinal corner edge of the bar is milled to provide an orienting flat 16 extending longitudinally of the bar and occurring in a plane at 45° to the planes of the several sides of the bar.

The tool holder block that I provide involves generally, a block-like body 20 having a tool seat 21 and a ways 22, a slide 23 slidably engaged with the ways 22 and having a head 24 related to the seat 21, manually operable actuating means 25 related to the body and the slide and operable to shift the slide relative to the body, and anchoring means 26 carried by the body and adapted to engage the tool rest R on which the body is engaged and to secure the body in fixed position thereon.

The body 20 is a block-like metal part having front and rear ends 30 and 31, parallel sides 32, a flat, horizontally disposed bottom 33 and a forwardly and upwardly inclined top 34. The top 34 is inclined at approximately 30°.

The seat 21 on the body is in the nature of a forwardly and upwardly opening notch established in the upper forward portion of the body and extending transversely thereof. The seat 21 has a flat, horizontal, upwardly disposed bottom surface 35, and a flat, vertical forwardly disposed back surface 36.

Figure 3:
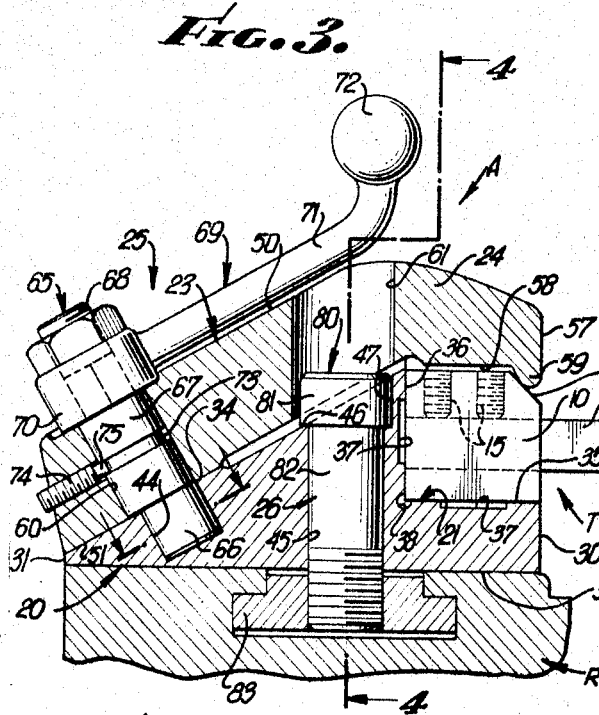
FIG. 3 is an enlarged detailed sectional view taken as indicated by line 3—3 on FIG. 2.

The surfaces 35 and 36 are substantially equal in width to the width of several sides of the bar 10 of the tool T, as clearly illustrated in FIG. 3 of the drawings.

In practice, the surfaces 35 and 36 of the seat are relieved, intermediate the transversely extending edges, by suitable transversely extending groove-like depressions 37 and so that when the bar 10 of the tool T is engaged on or in the seat, desired bearing engagement is established between the surfaces of the seat and the opposing sides of the bar 10, yet provision is made by the recesses 36 to accommodate for imperfections in the said sides of the bar and for the possible occurrence of foreign matter between the seat and bar, which would otherwise prevent proper seating of the bar in the seat.

Still further, and for substantially the same reasons as set forth in the preceding paragraph, the corner established by the adjacent traverse side edges of the surfaces 35 and 36 of the seat, is relieved by a transversely extending recess 38. The recess 38 is provided to accommodate the lower rear longitudinal corner edge of the bar and so as to assure proper seating of the two adjacent sides of the bar on the opposing surfaces of the seat.

The ways 22 on the body is established by the top wall 34 and by a pair of upwardly projecting flanges 39 with laterally inwardly projecting rails 40 provided at the opposite sides of the body and extending from the seat 21 rearwardly. The rails 40 have a straight, flat, parallel top and bottom surface 42 and 43 extending parallel with the top surface 34 of the body and in vertical spaced relationship therewith.

In addition to the foregoing, the body 20 is further provided with a substantially upwardly opening bearing socket 44 in its top 34 to cooperatively receive a part of the actuating means 25 and a vertically disposed opening 45 to cooperatively receive the anchoring means 26, as will hereinafter be described.

The bearing socket 44 is positioned in the rear portion of the body, intermediate the flanges 39 and on an axis normal to the plane of the top 34 of the body.

The opening 45 is positioned centrally of the body on an axis normal to the bottom 33 thereof and is provided with an upwardly disposed, flat, horizontally disposed, annular seat 46 in its upper end portion, which seat is established by an enlarged bore 47 entering the top of the body, concentric with the opening.

The slide 23 slidably engaged with and carried by the ways 22, is an elongate, rectangular, block-like part having front and rear ends, flat, parallel top and bottom surfaces 50 and 51 and vertically disposed, flat, parallel sides 52. The slide 23 is of greater vertical extent than the flanges 39 and is of slightly less lateral extent than the space between the flanges.

Figure 4:
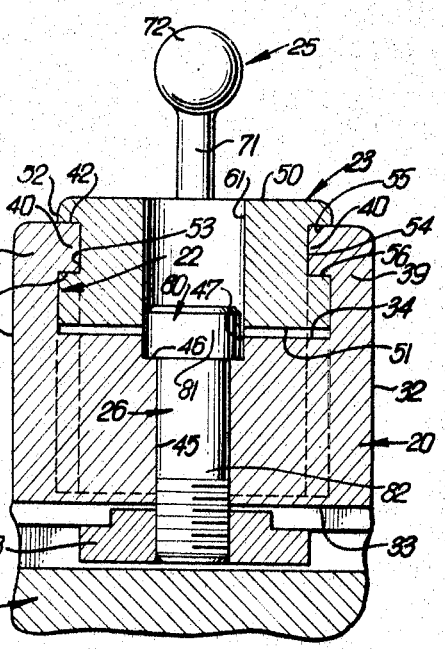
FIG. 4 is a detailed sectional view taken as indicated by line 4—4 on FIG. 3.

The sides 52 on the slide 23 are provided with longitudinal, laterally outwardly opening grooves 53 having a flat, vertically disposed, inner wall 54 and flat, parallel top and bottom walls 55 and 56. The grooves are slightly smaller in cross-section than the rails on the flanges 39 and are adapted to slidably receive the said rails when the slide is engaged with the way, as clearly illustrated in FIG. 4 of the drawings.

When the slide is in engagement with the way, the bottom surface 51 thereof slidably engages the top 34 of the body.

The head 24 on the slide 23 is in the nature of a continuation of the slide, projecting from the forward end thereof to overlie the seat 21 in the front of the body. The head 24 has a flat, vertical front surface 57 occuring in vertical plane in close proximity with the vertical plane of the front 30 of the body 20 and a flat, horizontally disposed bottom surface 58 occurring in a plane in close proximity with the uppermost part or top of the seat 21.

The head 24 is further provided with a downwardly projecting lip 59 extending transversely of the head, along the lower front edge thereof, which lip is adapted to engage the flat 15 provided on the bar 10 of the tool T engaged in the seat, as clearly illustrated in FIG. 3 of the drawings.

In addition to the foregoing, the slide is further provided with a bearing socket 60 in its rear portion, which opening extends between and is normal to the top and bottom surfaces 50 and 51 of the slide and communicates with the bearing socket 44 in the body.

The slide is further provided with a vertical access opening 61 in its forward portion to communicate with the opening 45 in the body and allow for access to the anchoring means 26.

The manual actuating means 25 provided by the present invention includes an elongate shaft 65, having a lower cylindrical portion 66 slidably and rotatably engaged in the bearing socket 44 in the body, an enlarged intermediate, cylindrical portion 67 slidably and rotatably engaged in the bearing opening 60 in the slide and an upper portion 68 projecting upwardly from the top of the slide. The means 25 further includes a manually engageable operating lever 69 secured to the upper portion 68 of the shaft.

The upper and central portions 68 and 67 of the shaft are in axial alignment, while the axis of the lower portion 66 is offset from the axis of the upper and central portions, as clearly illustrated in FIG. 3 of the drawings.

Figure 5:
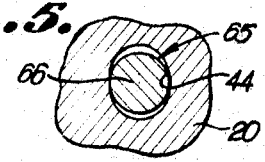
FIG. 5 is a detailed sectional view showing a portion of my invention taken as indicated by line 5—5 on FIG. 3.

In practice, and as illustrated in FIG. 5 of the drawings, the bearing socket 60 is elongated laterally of the body, so that the lower portion 66 of the shaft establishes sliding bearing engagement on or with the front and rear sides of the socket only and is free to shift laterally therein, as when the shaft is rotated.

The upper portion 68 of the shaft 65 is polygonal in cross-section (indicated by phantom lines in FIG. 3) and is provided with a threaded extension at its upper terminal end.

The lever 69 includes a body 70 having a polygonal opening to cooperatively receive the upper portion 68 of the shaft 65, an elongate arm 71 projecting from the body, radially of the axis of the shaft and overlying the top of the slide, and a knob-like grip 72 at the outer end of the arm.

In the preferred carrying out of the invention and as illustrated in FIG. 3 of the drawings, the central portion 67 of the shaft 65 is provided with an annular groove 73 and the slide 23 carries a threaded retaining pin 74 having a tip 75 projecting into the groove 73 and serving to maintain the shaft in engagement in the slide and to hold it against axial shifting and displacement.

The anchoring means 26 that I provide includes a suitable screw fastener 80 having a head 81 engaging the seat 46 in the body, an elongate threaded shank 82 depending from the head to extend freely through the opening 45 in the body and projecting downwardly therefrom, and a T-nut 83 threadedly engaged in the lower end of the fastener and slidably engaged in a T-slot provided in the rest R of the machine with which the structure is related. The fastener is preferably an Allen head fastener and is engaged in the body through the access opening in the slide 23, which opening is of sufficient size to allow free easy access to the means 25 and also to allow for uninterrupted relative shifting between the slide, body and fastener head.

It will be apparent from the foregoing that by rotating the shaft 65 by means of the lever arm 71, the slide 23 is shifted longitudinally in the ways 22 and, as a result, the lip 59 on the head 24, and occurring adjacent the upper forward portion of the tool bar 10, is shifted into engagement with the flat provided on the bar and urges the bar diagonally rearwardly and downwardly into tight clamped engagement with the surfaces 35 and 36 of the seat 21.

It will be further apparent that when the lip engages the flat on the bar 10, contact is established throughout the entire longitudinal extent of the lip, affording great stability to the bar in resisting pivotal movement upon the application of lateral forces at the end of the bar on which the cutter 12 is arranged.

It will be further apparent that when lateral forces are exterted at the end of the tool bar 10, through the cutter 12, these forces are transmitted through the bar to the seat 21 and the head 24 on the silde 23, via the lip 59. The forces exerted on the head are transmitted to the slide 23 and thence on the body 20 through the ways 22. The ways 22 being of considerable longitudinal extent occurring at the opposite sides of the body and slide and being of rugged construction, serve to distribute the forces exerted through the construction over a wide area and in such a way that little or no movement will result.

With the construction provided, the only point of possible failure occurs at the point of jointure between the slide and the head, which point might, upon the application of sufficient force through the construction, flex and thereby permit limited unseating of the bar in the seat 21. However, this portion or point of my construction is of sufficient size and weight, that a far greater force would be required to flex it, than could be withstood by any cutter that could be employed in the overall set-up.

It will be apparent that by operation of the actuating means 25 to release the tool bar 10, the bar can be easily and conveniently removed and replaced, as circumstances require.

Having described only a typical preferred form and application of my invention, I do not wish to be limited or restricted to the specific details herein set forth, but wish to reserve to myself any modifications or variations that may appear to those skilled in the art and which fall within the scope of the following claims.

Having described my invention, I claim:

1. A tool holder block of the character referred to including, an elongate horizontally disposed body having front and rear ends, a forwardly and upwardly opening tool bar seat at its front end and an elongate forwardly and upwardly inclined ways at its top, an elongate slide slidably engaged in the ways with a forwardly projecting head to overlie the seat and having a downwardly projecting tool bar engaging lip at its forward terminal end, manually operable actuating means to shift the slide longitudinally relative to the body and the lip into and out of engagement with a tool bar engaged in the seat and including an elongate shaft having one end portion engaged in a slot-like bearing socket in the rear portion of the body on an axis normal to the longitudinal axis of the ways, a central portion rotatably engaged in a bearing opening in the slide, the other end portion projecting from the slide and an elongate lever arm fixed to the said other end portion of the shaft to project radially therefrom, the central axis of said one end portion of the shaft being axially offset from the axes of said intermediate portion.

2. A structure as set forth in claim 1 which further includes, anchoring means for securing the body to a rest including, a vertical fastener receiving opening in the body, an elongate bore entering the top of the body concentric with said opening and defining an upwardly disposed shoulder, a screw fastener having a head engaged on the shoulder, a screw fastener having a head engaged on the shoulder and an elongate threaded shank projecting freely through the opening in the body to project downwardly therefrom and engage the rest, and an access opening in the slide above the fastener.

3. A structure as set forth in claim 1 which further includes, retaining means maintaining the shaft in engagement in the slide and including an annular outwardly opening groove in the central portion of the shaft and a retaining pin carried by the slide and engaged in the groove.

4 A structure as set forth in claim 1 which further includes, anchoring means for securing the body to a rest including, a vertical fastener receiving opening in the body, an elongate bore entering the top of the body concentric with said opening and defining an upwardly disposed shoulder, a screw fastener having a head engaged on the shoulder, a screw fastener having a head engaged on the shoulder and an elongate threaded shank projecting freely through the opening in the body to project downwardly therefrom and engage the rest, and an access opening in the slide above the fastener, retaining means maintaining the shaft in engagement in the slide and including an annular outwardly opening groove in the central portion of the shaft and a retaining pin carried by the slide and engaged in the groove.

5. A structure as set forth in claim 1 wherein, said ways include upwardly projecting laterally spaced longitudinal flanges on the body with laterally inwardly projecting longitudinal rails, said slide having laterally outwardly opening longitudinal grooves slidably receiving the rails.

6. A structure as set forth in claim 1 wherein, said ways include upwardly projecting laterally spaced longitudinal flanges on the body with laterally inwardly projecting longitudinal rails, said slide having laterally outwardly opening longitudinal grooves slidably receiving the rails, anchoring means for securing the body to a rest including, a vertical fastener receiving opening in the body, an elongate bore entering the top of the body concentric with said opening and defining an upwardly disposed shoulder, a screw fastener having a head engaged on the shoulder, a screw fastener having a head engaged on the shoulder and an elongate threaded shank projecting freely through the opening in the body to project downwardly therefrom and engage the rest, and an access opening in the slide above the fastener.

7. A structure as set forth in claim 1 wherein, said ways include upwardly projecting laterally spaced longitudinal flanges on the body with laterally inwardly projecting longitudinal rails, said slide having laterally outwardly opening longitudinal grooves slidably receiving the rails, retaining means maintaining the shaft in engagement in the slide and including an annular outwardly opening groove in the central portion of the shaft and a retaining pin carried by the slide and engaged in the groove.

8. A structure as set forth in claim 1 wherein, said ways include upwardly projecting laterally spaced longitudinal flanges on the body with laterally inwardly projecting longitudinal rails, said slide having laterally outwardly opening longitudinal grooves slidably receiving the rails, anchoring means for securing the body to a rest including, a vertical fastener receiving opening in the body, an elongate bore entering the top of the body concentric with said opening and defining an upwardly disposed shoulder, a screw fastener having a head engaged on the shoulder, a screw fastener having a head engaged on the shoulder and an elongate threaded shank projecting freely through the opening in the body to project downwardly therefrom and engage the rest, and an access opening in the slide above the fastener, retaining means maintaining the shaft in engagement in the slide and including an annular outwardly opening groove in the central portion of the shaft and a retaining pin carried by the slide and engaged in the groove.

9. A tool holder block of the character referred to including, an elongate body having front and rear ends, a flat, horizontally disposed tool rest engaging bottom, flat, vertical parallel sides, a forwardly and upwardly opening tool bar seat with a horizontal bottom surface and a vertical inner surface extending transverse the front end of the body, an elongate flat forwardly and upwardly inclined top and elongate ways extending parallel with the top, an elongate slide slidably engaged on the top and with the ways and having a forwardly projecting head to overlie the seat and having an elongate transversely extending and downwardly projecting tool bar engaging lip at its forward terminal end, manually operable actuating means to shift the slide longitudinally relative to the body and the lip into and out of engagement with a tool bar engaged in the seat and including an elongate shaft having a lower portion engaged in an upwardly opening transversely extending slot-like bearing socket in the rear portion of the body, a central portion rotatably engaged in a bearing opening in the slide, an upper portion projecting upwardly from the slide and an elongate lever arm fixed to the upper portion of the shaft to project radially therefrom, the central axis of said lower portion of the shaft being offset from the axes of said intermediate and upper portions, and anchoring means for securing the body to a rest having a flat supporting surface with a T-slot therein, including, a vertical fastener receiving opening in the body, an enlarged bore entering the top of the body concentric with said opening and defining an upwardly disposed shoulder, a screw fastener having a head engaged on the shoulder, an elongate threaded shank projecting freely through the opening in the body to project downwardly therefrom and a T-nut on the shank and engaged in the slot, and an access opening in the slide above said fastener.

10. A structure as set forth in claim 9 and further including, retaining means maintaining the shaft in engagement in the slide and including an annular outwardly opening groove in the central portion of the shaft and a retaining pin carried by the slide and engaged in the groove.

11. A structure as set forth in claim 9 wherein, said ways includes upwardly projecting longitudinal flanges at the opposite sides of the body with laterally inwardly projecting longitudinal rails, said slide having laterally outwardly opening longitudinal grooves slidably receiving the rails.

12. A structure as set forth in claim 9 and further including, retaining means maintaining the shaft in engagement in the slide and including an annular outwardly opening groove in the central portion of the shaft and a retaining pin carried by the slide and engaged in the groove, said ways including upwardly projecting longitudinal flanges at the opposite sides of the body with laterally inwardly projecting longitudinal rails, said slide having laterally outwardly opening longitudinal grooves slidably receiving the rails.

No references cited.

WILLIAM W. DYER, JR., *Primary Examiner.*

L. VLACHOS, *Examiner.*